(12) United States Patent
Rico et al.

(10) Patent No.: US 11,297,769 B2
(45) Date of Patent: Apr. 12, 2022

(54) PROCESS AND MACHINE FOR CONVEYING A FLOW OF HARVESTED CROP

(71) Applicant: CNH Industrial America LLC, New Holland, PA (US)

(72) Inventors: Vincent Rico, La Roche-sur-Yon (FR); Cedric Martin, Mûrs-Erigné (FR)

(73) Assignee: CNH Industrial America LLC, New Holland, PA (US)

( * ) Notice: Subject to any disclaimer, the term of this patent is extended or adjusted under 35 U.S.C. 154(b) by 109 days.

(21) Appl. No.: 16/620,753

(22) PCT Filed: Jun. 8, 2018

(86) PCT No.: PCT/EP2018/065134
§ 371 (c)(1),
(2) Date: Dec. 9, 2019

(87) PCT Pub. No.: WO2018/224641
PCT Pub. Date: Dec. 13, 2018

(65) Prior Publication Data
US 2020/0187419 A1 Jun. 18, 2020

(30) Foreign Application Priority Data
Jun. 8, 2017 (EP) ..................................... 17305685

(51) Int. Cl.
*A01D 61/00* (2006.01)
*A01D 46/28* (2006.01)
(Continued)

(52) U.S. Cl.
CPC ........... *A01D 61/00* (2013.01); *A01D 46/285* (2013.01); *B65G 47/31* (2013.01); *A01D 46/264* (2013.01)

(58) Field of Classification Search
CPC .... A01D 61/00; A01D 46/285; A01D 46/264; A01D 46/28; A01D 61/02; B65G 47/22;
(Continued)

(56) References Cited

U.S. PATENT DOCUMENTS

| 4,083,773 A | 4/1978 | Clary |
| 4,968,284 A | 11/1990 | Klimmer et al. |

(Continued)

FOREIGN PATENT DOCUMENTS

| DE | 2224687 A | 11/1973 |
| EP | 365411 A1 | 4/1990 |

(Continued)

OTHER PUBLICATIONS

International Search Report and Written Opinion for Application No. PCT/EP2018/065134 dated Oct. 22, 2018 (12 Pages).

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

A process for conveying a flow of harvested crop along a first conveyor, which is configured to convey the flow along a first direction, and a second conveyor arranged downstream of the first conveyor and which is configured to convey the flow along a second direction different from the first direction. The process includes operating the first conveyor at a variable conveyor speed presenting a cycle of acceleration and deceleration, the cycle being operable to ensure a spatial repartition of the flow of harvested crop on the second conveyor, which receives the flow at a location that is variable according to the first direction.

20 Claims, 2 Drawing Sheets

(51) Int. Cl.
*B65G 47/31* (2006.01)
*A01D 46/26* (2006.01)

(58) Field of Classification Search
CPC ...... B65G 47/64; B65G 47/642; B65G 47/53; B65G 47/68; B65G 47/31
USPC .......................................................... 460/134
See application file for complete search history.

(56) References Cited

U.S. PATENT DOCUMENTS

| | | | | |
|---|---|---|---|---|
| 6,257,978 | B1 * | 7/2001 | Meester | A01D 45/006 460/145 |
| 6,990,794 | B2 * | 1/2006 | Merant | A01D 46/00 56/328.1 |
| 7,104,388 | B2 * | 9/2006 | Walker | B65G 47/31 198/412 |
| 10,028,437 | B2 * | 7/2018 | Bomleny | A01D 41/127 |
| 2006/0270474 | A1 | 11/2006 | Messenger | |
| 2010/0096301 | A1 * | 4/2010 | Nyborg | B07B 13/10 209/667 |
| 2011/0253513 | A1 * | 10/2011 | Pax | B65G 27/12 198/750.8 |
| 2014/0144118 | A1 | 5/2014 | Le Neve et al. | |
| 2015/0208581 | A1 | 7/2015 | Korthuis et al. | |
| 2017/0143026 | A1 * | 5/2017 | Kodali | A23N 15/04 |
| 2018/0339865 | A1 * | 11/2018 | Schroader | G06K 9/00771 |

FOREIGN PATENT DOCUMENTS

| | | |
|---|---|---|
| EP | 3153007 A1 | 4/2017 |
| FR | 2863819 A1 | 6/2005 |
| GB | 623450 A | 5/1949 |
| GB | 1165079 A | 9/1969 |
| GB | 1556431 A | 11/1979 |

* cited by examiner

PROCESS AND MACHINE FOR CONVEYING A FLOW OF HARVESTED CROP

FIELD OF THE INVENTION

The invention relates to a process for conveying a flow of harvested crop along two consecutive conveyors which are configured to convey said flow along two different directions, as well as a harvesting machine comprising a device with such two conveyors and configured to implement such a process for conveying said flow along said conveyors.

The invention applies to the field of mechanized harvesting of berries growing on trees or bushes, especially berries such as grapes, raspberries, red, white or blackcurrants, and other berries growing in bunches.

BACKGROUND OF THE INVENTION

Berries are conventionally harvested by a harvesting machine comprising a motorised support structure which is movable along rows of plants, a harvesting unit being mounted onto said structure for straddling at least one of said rows of plants and harvesting berries from said row, in particular by means of a shaker system implemented in said harvesting unit. Then, the harvested crop obtained is conveyed into the machine to be stored in at least one hopper provided for that purpose or in an attached trailer.

However, because of the action of the shaker system, the harvested crop includes, in addition to detached berries, and among other things, juice, leaves, wood particles, bunches of berries of various sizes.

To eliminate material other than berries, in particular leaves and wood particles, harvesting machines further include a suction cleaning unit which is adapted to eliminate by suction said material from the harvested crop before its storage.

Moreover, the search for quality, in particular in the field of vinification, requires destemming of the cleaned harvested crop to separate the berries from the material attached to them, such as stalks, and thus to store only the separated berries. To do so, the harvesting machines may also carry a destemming unit located downstream of the cleaning unit for active destemming of the harvested crop after their cleaning by said cleaning unit. It furthermore is possible to perform a preliminary sorting of the cleaned harvested crop before destemming, in order to destem only the remaining portion of said crop including bunches.

In particular, harvesting machines are known, the motorized support structure thereof comprising a lower portion carrying a harvesting unit and an upper portion carrying a suction cleaning unit, a preliminary sorting unit, a destemming unit and at least one storage hopper, said harvesting machines further embedding a recovery unit, which comprises at least one bucket conveyor adapted to recover the harvested crop under the harvesting unit and to convey said harvested crop on said upper portion.

Such harvesting machines also embed conveying devices with motorized conveyors that are adapted to convey the harvested crop towards the different crop processing units located on the upper portion of the motorized support structure, said conveying being achieved along respective directions of said conveyors.

For example, a harvesting machine may comprise a conveying device with a first conveyor configured to convey a flow of harvested crop along a first direction L1, and a second conveyor arranged downstream of said first conveyor and which is configured to convey said flow along a second direction L2 different from said first direction L1, and notably substantially perpendicular to said first direction.

In particular, the second conveyor may be arranged under an ejection zone of the first conveyor in order to be fed by said first conveyor by ballistic effect of the flow of harvested crop, the suction cleaning unit being located above said ejection zone, in order to facilitate elimination by suction of material other than berries from said flow. Moreover, the second conveyor may be the mesh conveyor of the destemming unit, so as to directly allow the processing by said destemming unit of the flow of harvested crop that was just processed by the suction cleaning unit.

These conveyors are generally operated at a constant speed during a whole harvesting procedure. Thus, in the case of two consecutive conveyors arranged perpendicularly to each other, the flow of harvested crop is generally discharged by the upstream conveyor onto the downstream conveyor along a strip which fills only a part of the total width of said downstream conveyor, the position of said strip also depending on the position and the speed of the upstream conveyor in relation to the position and the speed of said downstream conveyor.

However, such a discharge of the crop onto the downstream conveyor may be problematic when the harvesting machine works in high yield conditions. Indeed, the discharged crop strip may thus present an important thickness, which can affect the quality of the destemming of said flow by the destemming unit. In particular, the destemming units generally present important widths, so that such a bad distribution of the harvested crop does not allow to use them at their maximum capacities while causing a quick local saturation.

SUMMARY OF THE INVENTION

The invention aims to improve the prior art by proposing a process for conveying a flow of harvested crop along two consecutive conveyors with different conveying directions, said process allowing to easily improve the discharge of the flow of harvested crop by the upstream conveyor onto the downstream conveyor, and then to improve the quality of the further processes applied to said conveyed flow.

For that purpose, and according to a first aspect, the invention relates to a process for conveying a flow of harvested crop along a first conveyor, which is configured to convey said flow along a first direction L1 to a downstream end of the first conveyor, and a second conveyor arranged downstream of said downstream end and which is configured to convey said flow along a second direction L2 different from said first direction L1, said process providing for operating the first conveyor at a variable conveyor speed presenting a cycle of acceleration and deceleration, said cycle being operable to ensure a spatial repartition of the flow of harvested crop on the second conveyor, which receives said flow at a location that is variable according to the first direction L1.

According to a second aspect, the invention relates to a harvesting machine comprising a harvesting unit, at least one crop processing unit for processing a crop harvested by said harvesting unit, and a device for conveying a flow of harvested crop between said units, said device comprising a first conveyor configured to convey said flow along a first direction L1 to a downstream end of said first conveyor and a second conveyor arranged downstream of said downstream end and which is configured to convey said flow along a second direction L2 different from said first direction, the conveying device being configured to implement such a process for conveying said flow along said conveyors.

BRIEF DESCRIPTION OF THE DRAWINGS

Other aspects and advantages of the invention will become apparent in the following description of an embodiment of the invention, with reference to the appended figures, wherein.

DETAILED DESCRIPTION OF THE INVENTION

Figure 1:
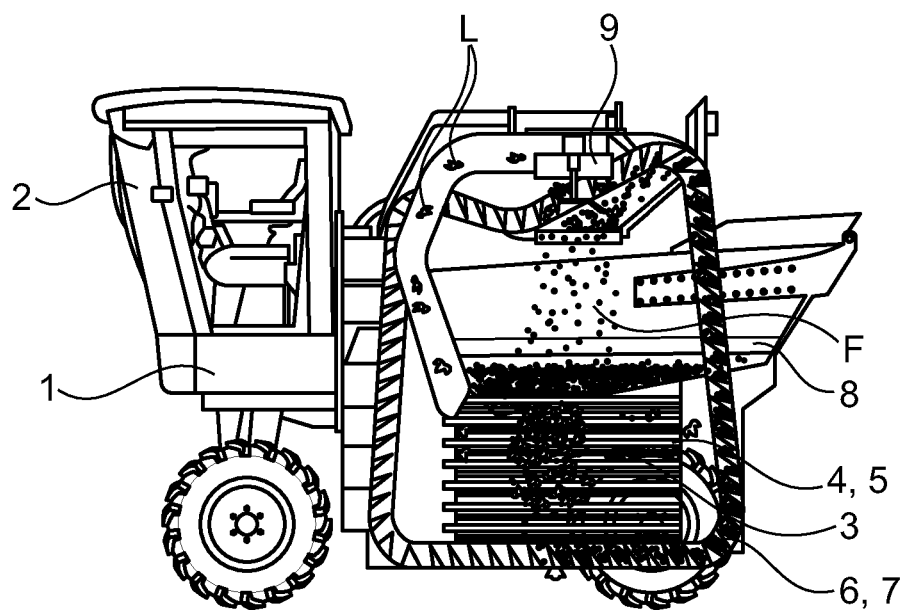
FIG. 1 represents a side view of a harvesting machine according to the invention.

With reference to these figures, we describe below a process for conveying a flow of harvested crop along a first conveyor 11, which is configured to convey said flow along a first direction L1, and a second conveyor 12 arranged downstream of said first conveyor and which is configured to convey said flow along a second direction L2 different from said first direction L1, as well as a harvesting machine comprising a device with two such conveyors 11, 12 and configured to implement such a process for conveying said flow along said conveyors.

The harvesting machine is in particular operable for the mechanical harvesting of berries growing on plants, such as trees or bushes, which are arranged in rows, and more particularly to berries, such as grapes, raspberries, red, white or blackcurrants, and other berries growing in bunches.

To this end, the harvesting machine comprises a motorized support structure 1, which is equipped with a driver station 2 and which is movable along rows of plants 3, a harvesting unit 4 being mounted onto a lower portion of said structure for straddling at least one of said rows of plants and detaching berries F from said plants.

In particular, the harvesting unit 4 can be mounted onto the support structure 1 permanently or removably, so as to be replaceable with other equipment and accessories, for example spraying equipment, pruning equipment or equipment for working the soil.

The harvesting unit 4 includes a straddling chassis, which delimits a harvesting tunnel into which the plants 3 are successively introduced to move through said tunnel between respective openings at the front and at the rear of said tunnel. Moreover, the harvesting unit 4 includes a shaker system including two shaker devices 5, said shaker devices being arranged on respective sides of the harvesting tunnel to delimit said tunnel transversely.

The harvesting machine also includes a unit 6 for continuously recovering the crop detached by the harvesting unit 4, which comprises in particular, in addition to the detached berries, stalks, juice, leaves L, pieces of wood and bunches of varied sizes. In one embodiment, the recovering unit 6 comprises at least one bucket conveyor 7 adapted to recover the harvested crop under the harvesting unit 4 and to convey said crop onto an upper portion of the machine, in particular for the storage of said crop in at least one hopper 8 provided for that purpose.

For ensuring the best quality of the crop, especially in the context of vinification of grapes, it is desirable to eliminate the material other than berries contained in the flow of harvested crop, in particular green residues such as stalks, leaves L, branches and pieces of wood. To this end, the harvesting machine may embed at least one crop processing unit on the upper portion of the support structure 1, in order to process the flow of harvested crop provided by the recovery unit 6 and to remove such residues from said flow before the storage of said crop in the hopper 8 and/or in an ancillary trailer.

In particular, with reference to FIG. 1, the harvesting machine comprises a suction cleaning unit 9, which is provided on the upper portion of the support structure 1 in order to clean the flow of harvested crop coming directly from the recovery unit 6 by eliminating by suction light residues, in particular leaves L, from said flow.

Figure 2:
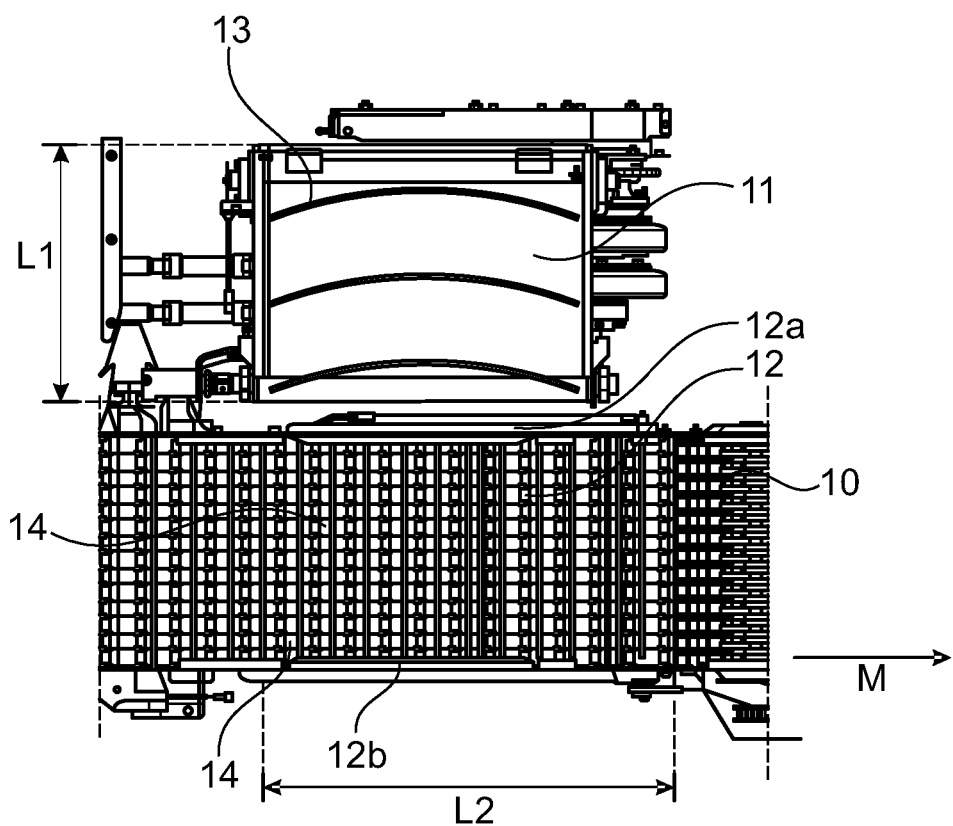
FIG. 2 represents schematically in a top view the conveying device of such a harvesting machine.

With reference to FIG. 2, the harvesting machine further comprises a destemming unit 10, which is arranged downstream of the suction cleaning unit 9 and which is adapted to apply a destemming process to the bunches contained in the flow of cleaned harvested crop, so as to remove the stalks attached to the berries F and to store only said berries and the juice.

To do so, the destemming unit 10 can comprise motorized rotary members (not shown), each of said rotary members including paddles which are adapted, on rotation of said rotary members, to interact with the flow of harvested crop in order to separate berries F from the bunches.

As represented in FIG. 2, the harvesting machine comprises a device for conveying the flow of harvested crop between the units 6, 9, 10 of said machine, said device comprising a first conveyor 11 operable to convey the flow of harvested crop provided by the recovery unit 6 along a first direction L1, until reaching an ejection zone located downstream of said first conveyor, wherein said conveyors pours said flow. The first conveyor 11 is driven at an effective conveying speed that makes the discharged flow travel along a ballistic trajectory through the ejection zone.

Meanwhile, the suction cleaning unit 9 is located above the ejection zone, so as to extract by suction light residues L other than berries from the flow of the harvested crop during its discharge from the first conveyor 11.

The conveying device also comprises a second conveyor 12 arranged downstream of the first conveyor 11 and which is arranged to receive the flow of harvested crop cleaned by the suction cleaning unit 9 and to convey it along a second direction L2 different from said first direction.

In particular, the conveying process provides to transfer the flow of harvested crop from the first conveyor 11 to the second conveyor 12 by ballistic effect. To this end, the second conveyor 12 is arranged under the ejection zone of the first conveyor 11, in order to be fed with the flow of harvested crop by said first conveyor by ballistic effect.

Further, the second conveyor 12 comprises a mesh conveyor of the destemming unit 10, so as to allow directly the processing by said destemming unit of the flow of harvested crop that was just processed by the suction cleaning unit 9.

In relation to FIG. 2, the first conveyor 11 comprises an impervious conveyor belt, which allows to conserve the integrality of the flow of harvested crop, and then to avoid losses of valuable material of said flow, especially the juice and/or the detached berries F with smallest sizes, during the conveying of said flow along said first conveyor. In particular, a storage hopper 8 is provided under the ejection zone of the first conveyor 11 for recovering notably the juice that may run from the downstream end of said first conveyor during the discharge of the flow of harvested crop within said ejection zone.

Moreover, the first conveyor 11 is configured to convey the flow of harvested crop along an ascending slope, and comprises curved ribs 13 which extend generally perpendicularly to its conveying direction L1 for retaining the material of the flow, and in particular the juice, on said conveyor during the conveying displacement of said flow along said conveyor.

The second conveyor 12 is arranged as a mesh and comprises openings 14 that are adapted to allow the juice and/or the detached berries F to pass through them, in particular to be recovered within a storage hopper 8 provided under said second conveyor, so as to keep only the bunches and larger debris in the flow of harvested crop, and then to avoid local saturation of the destemming unit 10 with material other than said bunches.

The first conveying direction L1 may be in particular substantially perpendicular to the second conveying direction L2. To that effect, in the embodiment shown on the figures, the first conveyor 11 extends along a first direction which is perpendicular to the moving direction M of the harvesting machine, in particular by being comprised in a transverse section plane of said harvesting machine, and the second conveyor 12 extends along a second direction L2 which is parallel to said moving direction, in particular by being comprised in a longitudinal section plane of said harvesting machine that also comprises said moving direction.

During a harvesting process, when the conveyors 11, 12 are operated at a constant speed, the flow of harvested crop is generally discharged by the first conveyor 11 onto the second conveyor 12 along a strip which fills only a part of the total width of said second conveyor, the position of said strip depending on the position and the speed of the first conveyor 11 in relation to the position and the speed of said second conveyor 12. The height and the width of the stream of crop material received on the second conveyor depends on the mass flow rate of the material and the speed of the second conveyor 12.

However, when the harvesting machine works in high yield conditions, the flow of harvested crop contains an important quantity of material. Thus, the stream poured onto the second conveyor 12 may present an important thickness, which can exceed the destemming capacity of the rotary members of the destemming unit 10 that actually engage the crop stream. The presence of a thick crop layer may affect the quality of the destemming achieved by the destemming unit 10.

In particular, the destemming unit 10 may present an important width, for example comprised between 385 mm and 500 mm, whereas a stream of material discharged by a first conveyor 11 operated at a constant speed generally fills only a half of said width, i.e. not more than 250 mm, so that the destemming unit 10 cannot be used at its maximum capacity, while being locally saturated too quickly.

To avoid these drawbacks, a conveying process is introduced which provides for operating the first conveyor 11 at a variable conveyor speed S presenting a cycle of acceleration and deceleration, said cycle being operable to ensure a spatial repartition of the flow of harvested crop on the second conveyor 12, which receives the flow at a location that is variable according to the first direction L1.

When the first conveying direction L1 is substantially perpendicular to the second conveying direction L2, as in the embodiment shown wherein the conveyors 11, 12 are perpendicular to each other, the first direction L1 is parallel to the width of the second conveyor 12, so that a spatial repartition of the flow discharged by said first conveyor onto said second conveyor will be variable according to said width.

In particular, the conveying device comprises a hydraulic system for operating the first conveyor 11 at the variable conveyor speed S. Advantageously, the hydraulic system may be a part of the system already implemented in the harvesting machine for controllably driving the conveyor, and can be implemented with the introduction of only additional special software for controlling a valve of the hydraulic conveyor drive circuitry. This allows to avoid using extra mechanical components.

Figure 3A:
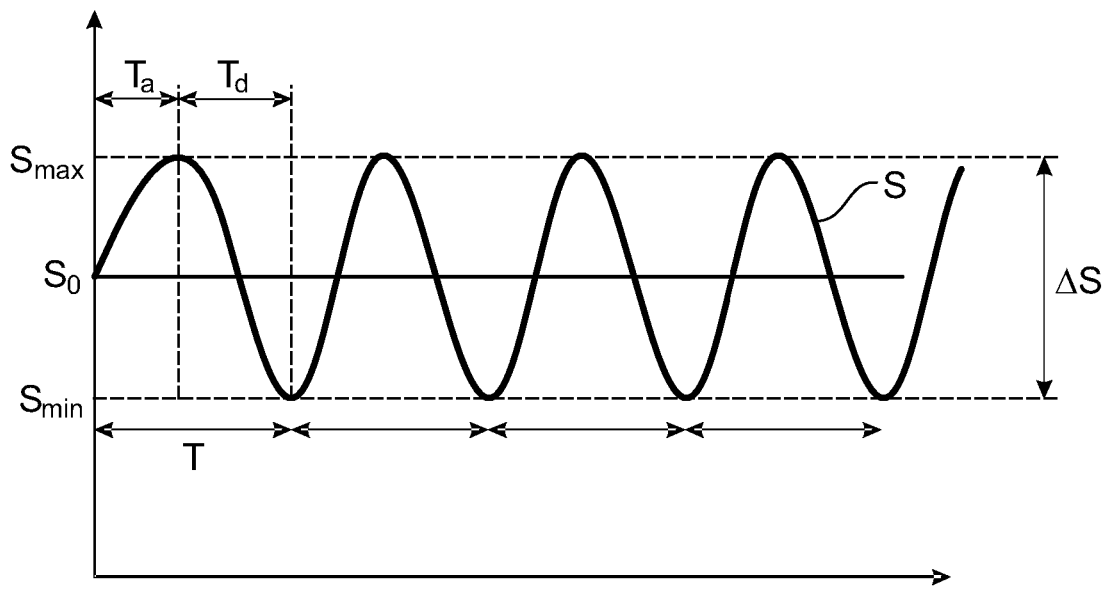
FIGS. 3a and 3b are charts representing the variation of the conveyor speed of the first conveyor, according to a respective variant of the invention.
Figure 3B:
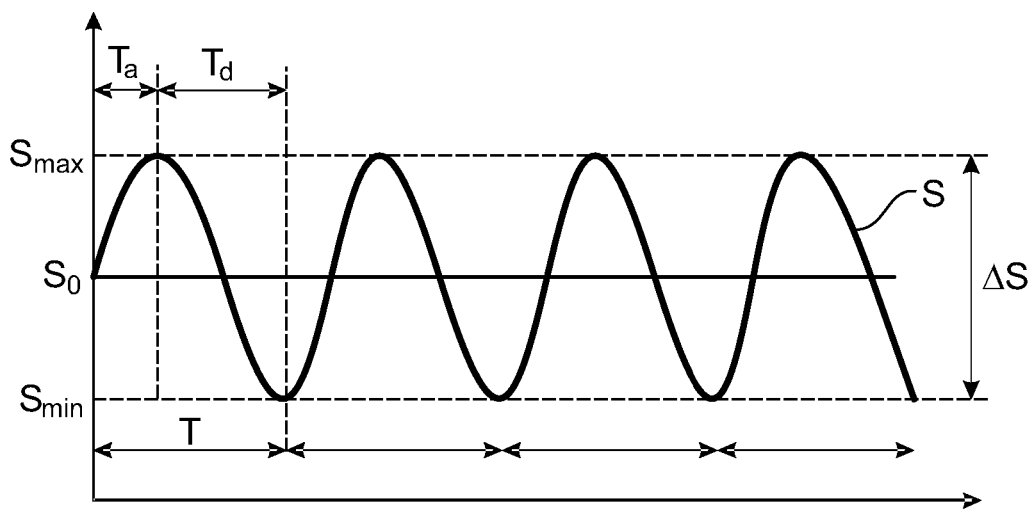

In relation to FIGS. 3a, 3b, the first conveyor 11 is operated to present a periodical variation of its conveyor speed S on either side of a nominal speed $S_o$, said variation being in particular sinusoidal.

In particular, the conveyor speed S can vary between a minimum speed $S_{min}$ and a maximum speed $S_{max}$, speed, which allows the first conveyor 11 to discharge the flow of harvested crop near respectively the proximal 12a and the distal 12b lateral edges of the second conveyor 12, i.e. the lateral edges of said second conveyor which are respectively the closest and the farthest from the downstream end of the first conveyor 11. In the embodiments shown on FIGS. 3a, 3b, the nominal speed $S_o$ corresponds in particular to a mathematical average of these two extreme speeds $S_{min}$, $S_{max}$.

The process may provide for adjusting one or more of the nominal speed $S_o$, minimum speed $S_{min}$ and a maximum speed $S_{max}$, in order to adapt the trajectory of the discharged crop to changing conditions of crop mass flow rate, machine inclination and speed of the suction cleaning unit. The resulting trajectory may be derived from images taken by a camera installed above the second conveyor 12 and used as a feedback for manual adjustment by the human operator or automatic adjustment by a controller, which processes the images and derives therefrom the repartition of the discharged crop. Alternatively, a radar or laser sensor may be used to establish the actual profile of the crop stream on the second conveyor.

The process can also provide for adjusting the amplitude ΔS and/or the cycle period T of the cycle of acceleration and deceleration of the first conveyor speed S, in particular according to the conveyor speed of the second conveyor 12. The adjustment could be done by a human operator, for example the driver of the harvesting machine, in particular by means of a dedicated button located on the control board or a soft button on a screen in the driver station 2. In a variant, the adjustment and/or the actuation of the speed variation could be controlled by a sensor or a camera that monitors the amount of crop or the quality of the harvested and processed crop.

According to an embodiment, the first conveyor 11 is operated to present a cycle period T of the cycle of acceleration and deceleration comprised between 0.5 and 2 s.

On FIG. 3a, the first conveyor 11 is operated at a variable conveyor speed S presenting a cycle wherein acceleration $T_a$ and deceleration $T_d$ time intervals are substantially equal.

Advantageously, as represented in FIG. 3b, the first conveyor 11 is operated at a variable conveyor speed S presenting a cycle wherein acceleration time $T_a$ is shorter than the subsequent deceleration time $T_d$. In particular, the acceleration time $T_a$ can be between ¼ and ⅓ of the cycle period T of the variation speed S, the deceleration time $T_a$ being then between ¾ and ⅔ of said period.

Thus, the first conveyor 11 can discharger the flow of harvested crop quickly near the distal lateral edge 12b of the second conveyor 12, and then more slowly spread the following part of said flow from said distal edge 12b towards the proximal edge 12a. This asymmetrical speed variation avoids squashing the material already poured onto the second conveyor 12, and thus improves the quality of the transverse repartition of said flow on said second conveyor, and notably the homogeneous thickness of the crop on said second conveyor.

Moreover, as the variation of the speed S of the first conveyor 11 may alter the length of the ballistic trajectory for low speeds, notably lower than $S_0$, and hence the effectiveness of the cleaning performed by the suction cleaning unit 9 over such shortened trajectory, said suction cleaning unit may be provided with a hood with important dimensions, in particular having a larger inlet area above the second conveyor 12, so as to compensate said loss of ballistic effect.

The invention claimed is:

1. A process comprising:
    conveying a flow of harvested crop along a first conveyor, which is configured to convey the flow along a first direction to a downstream end of the first conveyor;
    conveying the flow of the harvested crop along a second conveyor arranged downstream of the downstream end and which is configured to convey the flow along a second direction different from the first direction; and
    operating the first conveyor at a variable conveyor speed presenting a cycle of acceleration and deceleration, with an acceleration time differing from a subsequent declaration time, the cycle being operable to ensure a spatial reparation of the flow of harvested crop on the second conveyor, which receives the flow at a location that is variable according to the first direction.

2. The process according to claim 1, wherein the first conveying direction is substantially perpendicular to the second conveying direction.

3. The process according to claim 1, further comprising transferring the flow of harvested crop from the first conveyor to the second conveyor by ballistic effect.

4. The process according to claim 1, wherein the operating comprises operating the first conveyor to present a periodical variation of its conveyor speed on either side of a nominal speed.

5. The process according to claim 4, wherein the operating comprises operating the first conveyor to present a sinusoidal variation of its conveyor speed.

6. The process according to claim 1, further comprising adjusting an amplitude or a cycle period of the cycle of acceleration and deceleration of the first conveyor speed.

7. The process according to claim 1, wherein the operating comprises operating the first conveyor to present a cycle period of the cycle of acceleration and deceleration between 0.5 s and 2 s.

8. The process according to claim 1, wherein the operating comprises operating the first conveyor at a variable conveyor speed presenting a cycle wherein the acceleration time is shorter than the subsequent deceleration time.

9. The process according to claim 8, wherein the operating comprises operating the first conveyor to present a periodical variation of its conveyor speed on either side of a nominal speed, and wherein the acceleration time is between ¼ and ⅓ of the period of the variable conveyor speed, the deceleration time being between ¾ and ⅔ of the period.

10. A harvesting machine comprising
    a harvesting unit,
    at least one crop processing unit for processing a crop harvested by the harvesting unit, and
    a device for conveying a flow of harvested crop between the units, the device comprising a first conveyor configured to convey the flow along a first direction to a downstream end of the first conveyor and a second conveyor arranged downstream of the downstream end and which is configured to convey the flow along a second direction different from the first direction, wherein the device is configured for operating the first conveyor at a variable conveyor speed presenting a cycle of acceleration and deceleration, with an acceleration time differing from a subsequent declaration time, the cycle being operable to ensure a spatial repartition of the flow of harvested crop on the second conveyor, which receives the flow at a location that is variable according to the first direction.

11. The harvesting machine according to claim 10, wherein the flow of harvested crop comprises berries growing in bunches, the harvesting machine further comprising a destemming unit adapted to achieve a destemming process on the bunches, the second conveyor comprising a mesh conveyor of the destemming unit.

12. The harvesting machine according to claim 10, wherein the device further comprises a hydraulic system for operating the first conveyor at the variable conveyor speed.

13. The harvesting machine according to claim 10, wherein the first conveyor comprises a belt conveyor.

14. The harvesting machine according to claim 10, wherein the first conveyor extends along a first direction which is perpendicular to a moving direction of the machine, and the second conveyor extends along a second direction which is parallel to the moving direction.

15. The machine according to claim 10, wherein the second conveyor is arranged under an ejection zone of the first conveyor in order to be fed by the first conveyor by ballistic effect of the flow of harvested crop.

16. The harvesting machine according to claim 15, wherein the flow of harvested crop comprises material other than berries, wherein the harvesting machine further comprising a suction cleaning unit adapted to achieve a cleaning process on the flow by eliminating by suction the material from the flow, the suction cleaning unit being located above the ejection zone.

17. The harvesting machine according to claim 10, wherein the device is configured for operating the first conveyor at a variable conveyor speed presenting a cycle wherein the acceleration time is shorter than the subsequent deceleration time.

18. The harvesting machine according to claim 10, wherein the device is configured for operating the first conveyor to present a periodical variation of its conveyor speed on either side of a nominal speed, and wherein the acceleration time is between ¼ and ⅓ of the period of the variable conveyor speed, the deceleration time being between ¾ and ⅔ of the period.

19. A harvesting machine comprising
    a harvesting unit,
    at least one crop processing unit for processing a crop harvested by the harvesting unit, and
    a device for conveying a flow of harvested crop between the units, the device comprising a first conveyor configured to convey the flow along a first direction to a downstream end of the first conveyor and a second conveyor arranged downstream of the downstream end and which is configured to convey the flow along a second direction different from the first direction, wherein the device is configured for operating the first conveyor at a variable conveyor speed presenting a cycle of acceleration and deceleration, the cycle being operable to ensure a spatial repartition of the flow of harvested crop on the second conveyor, which receives the flow at a location that is variable according to the first direction, wherein the first conveyor extends along a first direction which is perpendicular to a moving direction of the machine, and the second conveyor extends along a second direction which is parallel to the moving direction.

20. The harvesting machine according to claim 19, wherein the device is configured for operating the first conveyor at a variable conveyor speed presenting a cycle wherein the acceleration time is shorter than the subsequent deceleration time.

* * * * *